United States Patent
Lee et al.

(10) Patent No.: US 12,381,911 B2
(45) Date of Patent: Aug. 5, 2025

(54) COUNTERATTACK METHOD AGAINST HACKED NODE IN CAN BUS PHYSICAL LAYER, PHYSICAL LAYER SECURITY METHOD WITH CAN BUS NODE ID AUTO-SETTING, AND RECORDING MEDIUM AND SYSTEM FOR PERFORMING THE METHOD

(71) Applicant: AY Innovative Co. Ltd., Seoul (KR)

(72) Inventors: Seong Soo Lee, Seoul (KR); Tae Wook Kang, Yangju-si (KR)

(73) Assignee: AY Innovative Co. Ltd., Seoul (KR)

(*) Notice: Subject to any disclaimer, the term of this patent is extended or adjusted under 35 U.S.C. 154(b) by 300 days.

(21) Appl. No.: 18/032,473

(22) PCT Filed: Dec. 28, 2020

(86) PCT No.: PCT/KR2020/019184
§ 371 (c)(1),
(2) Date: Apr. 18, 2023

(87) PCT Pub. No.: WO2022/085863
PCT Pub. Date: Apr. 28, 2022

(65) Prior Publication Data
US 2024/0031404 A1    Jan. 25, 2024

(30) Foreign Application Priority Data
Oct. 21, 2020 (KR) .................. 10-2020-0136471
Oct. 21, 2020 (KR) .................. 10-2020-0136473

(51) Int. Cl.
*H04L 9/40*    (2022.01)
*H04L 12/40*    (2006.01)

(52) U.S. Cl.
CPC .... *H04L 63/1466* (2013.01); *H04L 12/40104* (2013.01); *H04L 63/1425* (2013.01); *H04L 2012/40215* (2013.01)

(58) Field of Classification Search
CPC .......... H04L 63/1466; H04L 12/40104; H04L 63/1425; H04L 2012/40215; H04L 63/0236; H04L 12/40; H04L 2012/40273
See application file for complete search history.

(56) References Cited

U.S. PATENT DOCUMENTS 10,958,470 B2 * 3/2021 Hass ................... G06F 11/0739
2010/0150176 A1 * 6/2010 Yakashiro ......... H04L 12/40163
370/475

(Continued)

FOREIGN PATENT DOCUMENTS

JP       4232603 B2   3/2009
KR    10-1586601 B1   2/2016

(Continued)

OTHER PUBLICATIONS

Tae-Wook Kang et al., Physical Lay Security Method with CAN Bus Node ID Auto-Setting, j.inst.Korean.electr.electron.eng. vol. 24, No. 2,665-668, Jun. 2020.

(Continued)

*Primary Examiner* — Joseph P Hirl
*Assistant Examiner* — Aayush Aryal
(74) *Attorney, Agent, or Firm* — Stein IP, LLC

(57) ABSTRACT

A counterattack method against a hacked node in a controller area network (CAN) bus physical layer includes: setting node IDs (NIDs), which are different unique IDs, for each of a plurality of nodes connected to a CAN bus line; determining that an error frame is generated when at least one of a node using a forged NID, a node using a different NID, and a node using a non-existent NID is found; increasing counts (Continued)

of a transmit error counter (TEC) and a receive error counter (REC) of a transmitting node and a receiving node whenever the error frame is generated; and allowing a node of which the count of the TEC or REC is greater than a set threshold value to enter a bus-off state to block the node.

22 Claims, 17 Drawing Sheets

(56) References Cited

U.S. PATENT DOCUMENTS

| | | | | |
|---|---|---|---|---|
| 2011/0188371 | A1* | 8/2011 | Brunnberg | H04L 41/0677 370/242 |
| 2020/0213351 | A1* | 7/2020 | Shin | H04L 12/40 |

FOREIGN PATENT DOCUMENTS

| | | |
|---|---|---|
| KR | 10-1714770 B1 | 3/2017 |
| KR | 10-2018-0069843 A | 6/2018 |
| KR | 10-2019-0003112 A | 1/2019 |
| KR | 10-2019-0014391 A | 2/2019 |
| KR | 10-2020-0021297 A | 2/2020 |
| WO | WO-2017127639 A1 * | 7/2017 ........... G06F 21/554 |

OTHER PUBLICATIONS

Habeeb Olufowobi, Sena Hounsinou, and Gedare Bloom. 2019. Controller Area Network Intrusion Prevention System Leveraging Fault Recovery. In ACM Workshop on Cyber-Physical Systems Security & Privacy (CPS-SPC'19), Nov. 11, 2019, London, United Kingdom. ACM, New York, NY, USA, 11 pages. https://doi.org/10.1145/3338499.3357360.

Masaru Takada et al., Counter Attack Against the Bus-Off Attack on CAN, 2019 $14^{th}$ Asia Joint Conference on Information Security (AsiaJCIS).

Siti-Farhana Lokman et al., Intrusion detection system for automotive Controller Area Network (CAN) bus system: a review, EURASIP Journal on Wireless Communications and Networking, 2019.

Vol. 2, No. 4, pp. 1469-1472, Dec. 2019 (Kang, Tae-Wook et al. Counterattack Method against Hacked Node in CAN Bus Physical Layer. Journal of Institute of Electrical and Electronic Engineers).

* cited by examiner

| MID \ DLC | 4b0010 | 4b0100 | 4b0110 | 4b1000 |
|---|---|---|---|---|
| 0x102 | 0x1000~0x1FFF | 0x2000~0x2FFF | 0x3000~0x3FFF | 0x4000~0x4FFF |
| 0x133 | 0x0A00~0x0AFF | 0x0B00~0x0BFF | 0x0C00~0x0CFF | 0x0D00~0x0DFF |
| 0x486 | 0x9000~0x9FF0 | 0x8000~0x8FF0 | 0x7000~0x7FF0 | 0x6000~0x6FF0 |
| 0x75A | 0x0E00~0x0EFF | 0x0F00~0x0FFF | 0x0500~0x05FF | 0x0000~0x00FF |

| MID \ DLC | 4b0010 | 4b0100 | 4b0110 | 4b1000 |
|---|---|---|---|---|
| 0x102 | 0x1000~0x1FFF | 0x2000~0x2FFF | 0x3000~0x3FFF | 0x4000~0x4FFF |
| 0x133 | 0x0A00~0x0AFF | 0x0B00~0x0BFF | 0x0C00~0x0CFF | 0x0D00~0x0DFF |
| 0x486 | 0x9000~0x9FF0 | 0x8000~0x8FF0 | 0x7000~0x7FF0 | 0x6000~0x6FF0 |
| 0x75A | 0x0E00~0x0EFF | 0x0F00~0x0FFF | 0x0500~0x05FF | 0x0000~0x00FF |

ID AUTO-SETTING, AND RECORDING MEDIUM AND SYSTEM FOR PERFORMING THE METHOD

COUNTERATTACK METHOD AGAINST HACKED NODE IN CAN BUS PHYSICAL LAYER, PHYSICAL LAYER SECURITY METHOD WITH CAN BUS NODE ID AUTO-SETTING, AND RECORDING MEDIUM AND SYSTEM FOR PERFORMING THE METHOD

TECHNICAL FIELD

The present invention relates to a counterattack method against a hacked node in a controller area network (CAN) bus physical layer, a physical layer security method with CAN bus node identifier (ID) auto-setting, and a recording medium and system for performing the same, and more particularly, to technology for defending against a malicious attack by allowing an intrusion detection system to increase an error counter of an internal attack node and separate the internal attack node from a bus when a malicious data frame is detected on a CAN bus and a physical layer security technology of distinguishing each node by automatically assigning a unique ID to each node whenever the CAN bus is booted-up.

BACKGROUND ART

Today, in most cars, electronic control units (ECU) inside a vehicle are connected based on a controller area network (CAN) bus. One feature of a CAN bus is that addresses of nodes participating in communication do not exist. This has many advantages such as simultaneous transmission and multiple transmissions, but also brings security vulnerabilities.

When one of the nodes participating in communication is hacked to transmit a malicious data frame, it is very difficult to block the corresponding node because it is not known which node transmits the data frame. When the malicious data frame is not blocked, it is possible to overload the CAN bus and prevent normal communication or attack other nodes and cause dangerous actions to users.

Specifically, as one feature of the CAN communication protocol, nodes connected to the CAN bus do not have addresses, and thus, if one of the nodes participating in the communication is hacked by a hacker and transmits malicious data frames, it is difficult to identify which electronic control device is the problem.

Since the hacked node can transmit the malicious data frames to overload the CAN bus, cause other nodes to malfunction, or steal other normal nodes, user safety can beat a huge risk. Therefore, it is necessary to prepare for accidents by identifying malicious nodes occurring on the CAN bus and coping with the malicious nodes quickly.

In addition, most automotive electronic systems are controlled by an ECU and transmit and receive data through a CAN bus. A processor ID and an encryption key for communication are uniquely assigned to the ECU installed in a vehicle. Accordingly, whenever the communication is performed, the program checks the processor ID and encryption key for communication, and when hacking is suspected, a command is issued to block the communication.

However, when the hacking is advanced, all software operations of the corresponding ECU may be tampered with, and therefore normal communication data transmitted on the CAN bus may be monitored to infer and forge the processor ID and communication encryption key and ignore the communication blocking command.

Therefore, in order to fundamentally prevent communication interference and malicious data transmission due to the hacking, the communication of the hacked nodes needs to be blocked on the CAN bus in hardware. In order to block a node that has already been hacked and interferes with the CAN communication and transmits the malicious data, first, there is a need to uniquely specify individual nodes on the CAN bus, but the CAN bus does not have a function of identifying individual nodes like a media access control (MAC) address of Ethernet.

There is also a method of assigning a unique ID in hardware when producing a CAN controller, but in this case, in order to assign a unique ID to every chip, the number of bits of the unique ID is greatly increased, greatly reducing the transmission efficiency of the CAN bus.

In addition, when unique IDs are assigned collectively at a factory after all nodes are mounted on the CAN bus, since the number of nodes within the same CAN bus is small, the number of bits of the unique ID is greatly reduced, but it is necessary to perform ID assignment at the factory again whenever parts are replaced, which is a very cumbersome problem.

RELATED ART DOCUMENTS

Patent Documents (Patent Document 1) JP 4232603 B2
(Patent Document 2) KR 10-1332339 B1
(Patent Document 3) KR 10-2009-0065260 A

DISCLOSURE

Technical Problem

Accordingly, the present invention provides a counterattack method against a hacked node in a controller area network (CAN) bus physical layer to immediately counterattack against various attack scenarios.

The present invention provides a recording medium on which a computer program for executing a counterattack method against a hacked node in a CAN bus physical layer is recorded.

The present invention provides a system for performing a counterattack method against a hacked node in a CAN bus physical layer.

The present invention provides a physical layer security method with CAN bus node ID auto-setting in which a unique ID is automatically assigned to each node whenever a CAN bus is booted up.

The present invention provides a recording medium on which a computer program for executing the physical layer security method with CAN bus node ID auto-setting is recorded.

The present invention provides an apparatus for performing the physical layer security method with CAN bus node ID auto-setting.

Technical Solution

According to an aspect of the present invention, a counterattack method against a hacked node in a controller area network (CAN) bus physical layer comprises: setting node IDs (NIDs), which are different unique IDs, for each of a plurality of nodes connected to a CAN bus line; determining that an error frame is generated when at least one of a node using a forged NID, a node using a different NID, and a node using a non-existent NID is found; increasing counts of a transmit error counter (TEC) and a receive error counter (REC) of a transmitting node and a receiving node whenever the error frame is generated; and allowing a node of which the count of the TEC or REC is greater than a set threshold value to enter a bus-off state to block the node.

In an embodiment of the present invention, determining that the error frame is generated comprises detecting hacking by a node where a stolen NID is set when a node using a forged NID is found.

In an embodiment of the present invention, determining that the error frame is generated comprises detecting hacking by an intrusion detection system (IDS) when a node using a different NID or a node using a non-existent NID is found.

In an embodiment of the present invention, the setting node IDs (NIDs), which are different unique IDs, for each of the plurality of nodes connected to the CAN bus line comprises setting 4 lower bits of a message ID area as an NID value when transmitting a data frame.

In an embodiment of the present invention, increasing the counts of the TEC and REC of the transmitting node and the receiving node whenever the error frame is generated comprises increasing the count of the TEC of the transmitting node by 8, and in a case of the receiving node, increasing the count of the REC of a node that first generates an error frame by 8, and increasing the count of the REC of other nodes by 1 when the error frame is generated.

In an embodiment of the present invention, the method further comprises decreasing the counts of the TEC and REC of the transmitting node and the receiving node whenever a message is successfully transmitted.

In an embodiment of the present invention, allowing the node of which the count of the TEC or REC is greater than the set threshold value to enter the bus-off state to block the node comprises separating the node when the count of the TEC or REC of the node is greater than 256.

According to an embodiment for realizing another object of the present invention, a computer-readable storage medium is recorded with a computer program for executing the counterattack method against a hacked node in a CAN bus physical layer.

According to another aspect of the present invention, a counterattack system against a hacked node in a CAN bus physical layer comprises a plurality of nodes connected to a CAN bus line and having node IDs (NIDs), which are different unique IDs, set thereon; an intrusion detection system (IDS) for determining whether a node has been hacked by analyzing contents of a data frame loaded into the CAN bus line; a counter for increasing counts of a transmit error counter (TEC) and a receive error counter (REC) of a transmitting node and a receiving node whenever an error frame is generated, and decreasing the counts of the TEC and REC of the transmitting node and the receiving node whenever a message is successfully transmitted; and a node explosion system (NES) mounted on each of the plurality of nodes and the IDS and for allowing a node of which the count of TEC or REC is greater than a set threshold value to enter a bus-off state to block the node.

In an embodiment of the present invention, when a node using a forged NID is found, the NES of a node where a stolen NID is set detects hacking.

In an embodiment of the present invention, when a node using a different NID or a node using a non-existent NID is found, the NES of the IDS detects hacking.

In an embodiment of the present invention, the NID of each node is set in 4 lower bits of a message ID area when transmitting a data frame.

According to still another aspect of the present invention, a physical layer security method with CAN bus node ID auto-setting comprises starting a clock count when nodes connected to the CAN bus line are booted up, and setting a temporary ID (TID) when the clock counter reaches a threshold value and transmitting a data frame; storing, by nodes that detect a recessive signal during the clock count operation or detect the recessive signal before generating a transmitter (Tx) signal after completing the clock count, node IDs (NIDs), which are different unique IDs of each node, appearing on a bus; setting a TID of a node receiving an Ack signal transmitted from an intrusion detection system (IDS) that transmits the data frame with the set TID as the NID; and starting the clock count again when the CAN bus enters an idle state, setting the TID to a value obtained by adding 1 to an NID appearing on a bus line when the clock count reaches the set value and transmitting the data frame.

In an embodiment of the present invention, the physical layer security method further comprises transmitting, when the operations are repeatedly performed to set the NIDs of all nodes connected to the bus line, an error frame from the IDS to notify each node that the NID setting is completed and allow the nodes to start communication.

In an embodiment of the present invention, when transmitting the data frame with the set NID, the set NID is written in 4 lower bits of a message ID area and transmitted.

In an embodiment of the present invention, the physical layer security method further comprises detecting an occurrence of a bit error in a data field when transmitting the data frame in a case in which nodes where the same NID is set simultaneously transmit different data; storing, in response to detecting the occurrence of the bit error, the digit of a bit of the data field, in which the bit error occurs; and determining, when the bit error consecutively occurs at the same digit a preset number of times, that the same NID is set without transmitting an error frame and changing the NID.

In an embodiment of the present invention, the physical layer security method further comprises detecting, when one of the nodes where the same NID is set transmits data, an occurrence of an error while a node not transmitting data receives arbitration field RTR data; checking, when a node transmits the data frame, by a node that does not transmit data, whether the node's own NID consecutively appears on the CAN bus a preset number of times; and determining, when the node's own NID consecutively appears the preset number of times, that the same NID is set and changing the node's own NID.

In an embodiment of the present invention, storing the node IDs (NIDs), which are unique different IDs of each node, appearing on the bus further comprises initializing the clock count and waiting for communication to end.

In an embodiment of the present invention, setting the TID and transmitting the data frame comprise setting the threshold value of the clock count to 16'hFFFF.

According to an embodiment for realizing another object of the present invention, a computer-readable storage medium is recorded with a computer program for executing the physical layer security method with CAN bus node ID auto-setting.

According to still yet another aspect of the present invention, a physical layer security apparatus with a CAN bus node ID auto-setting comprises an auto ID setup unit configured to, when nodes connected to a CAN bus line are booted up, start a clock count, set a temporary ID (TID)

when the clock counter reaches a threshold value, and transmit a data frame, and set the TID of a node receiving an Ack signal transmitted from an intrusion detection system (IDS) transmitting a data frame with the set TID to node IDs (NIDs), which are different unique IDs of each node; an NID storage unit configured to store NIDs of nodes that detect a recessive signal during a clock count operation or detect the recessive signal before generating a transmitter (Tx) signal after completing the clock count; a state machine configured to start the clock count again when the CAN bus enters an idle state, set the TID to a value obtained by adding 1 to an NID appearing on a bus line when the clock count reaches a set value, and transmit a data frame, and a transmit buffer configured to, when the NIDs of all nodes connected to the bus line are set, transmit an error frame from the IDS to notify each node that the NID setting is completed to start communication.

In an embodiment of the present invention, the physical layer security apparatus is implemented on a CAN controller, wherein, in a case where nodes having the same NID set therein simultaneously transmit different data, when a bit error occurs in a data field when transmitting a data frame, the physical layer security apparatus stores the digit of a bit of the data field in which the error occurs, and when the bit error consecutively occurs at the same digit a preset number of times, does not transmit an error frame, determines that the same NID is set, and changes the NID, and wherein, when one of the nodes where the same NID is set transmits data and when an error occurs while a node that does not transmit data receives arbitration field RTR data, the node that does not transmit data checks whether the node's own NID consecutively appears on the CAN bus a preset number of times when a node transmits the data frame, and determines, when the node's own NID consecutively appears the preset number of times, that the same NID is set and changes the node's own NID.

Advantageous Effects

According to a counterattack method against a hacked node in a controller area network (CAN) bus physical layer, when a malicious data frame is detected on a CAN bus, an intrusion detection system (IDS) increases an error counter of an internal attack node and separates the internal attack node from the bus to defend against malicious attacks.

It is possible to immediately counterattack against all network attacks that can occur on the CAN bus in a hardware method of setting a node ID (NID) of the CAN controller and the IDS. Accordingly, it is possible to increase user safety and enhance security performance.

According to the physical layer security method with CAN bus node ID auto-setting, each node is distinguished by automatically assigning unique IDs to individual nodes whenever a CAN bus is booted up on the CAN bus. According to the present invention, since the NID, which is the unique ID, is assigned whenever the CAN bus is booted up, it is possible to easily apply the unique ID and greatly reduce the number of bits of the unique ID regardless of replacement of parts.

In addition, it is possible to counterattack all network attacks that can occur on the CAN bus by setting the IDS and the NID of the CAN controller. Accordingly, it is possible to increase user safety and enhance security performance.

MODES OF THE INVENTION

Figures 1, 2:
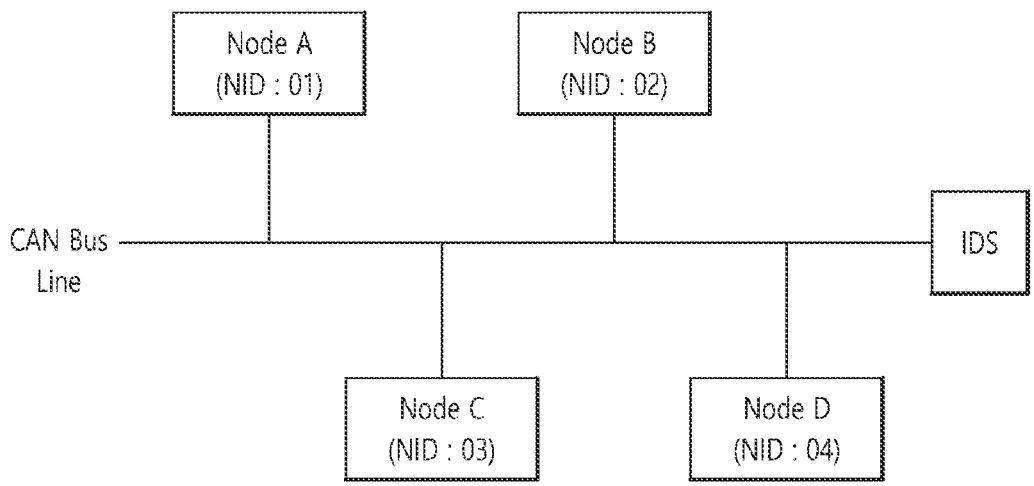
FIG. 1 is a block diagram of a counterattack system against a hacked node in a controller area network (CAN) bus physical layer according to an embodiment of the present invention.
FIG. 2 is a table illustrating a transmittable data range according to a message ID (MID) and a data length code (DLC) of a node where anode ID (NID) is set in FIG. 1.

The detailed description of the present invention set forth below refers to the accompanying drawings, which show by way of illustration specific embodiments in which the invention may be practiced. These embodiments will be described in detail for those skilled in the art in order to practice the present invention. It should be appreciated that various exemplary embodiments of the present invention are different from each other, but do not have to be exclusive. For example, specific shapes, structures, and characteristics described in the present specification may be implemented in another exemplary embodiment without departing from the spirit and the scope of the present invention in connection with an exemplary embodiment. In addition, it should be understood that a position or an arrangement of individual components in each disclosed exemplary embodiment may be changed without departing from the spirit and the scope of the present invention. Therefore, the following detailed description should not be construed as being restrictive. In addition, the scope of the present invention is defined only by the accompanying claims and their equivalents if appropriate. Similar reference numerals will be used to describe the same or similar functions throughout the accompanying drawings.

Hereinafter, exemplary embodiments of the present invention will be described in more detail with reference to the accompanying drawings.

FIG. 1 is a block diagram of a counterattack system against a hacked node in a CAN bus physical layer according to an embodiment of the present invention. FIG. 2 is a table illustrating a transmittable data range according to a message ID (MID) and a data length code (DLC) of a node where a node ID (NID) is set in FIG. 1.

A counterattack system 1 (hereinafter, system) against a hacked node in a CAN bus physical layer according to the present invention provides a technique in which, when a malicious data frame is detected on the CAN bus, an intrusion detection system increases an error counter of an internal attack node and separates the internal attack node from the bus to defend against malicious attacks. For example, a CAN controller equipped with the technique proposed in the present invention may be implemented using Verilog hardware description language (Verilog HDL).

Referring to FIG. 1, a system 1 according to the present invention includes a plurality of nodes (node A, B, C. and D) connected to a CAN bus line, an intrusion detection system (IDS), a counter (not illustrated), and a node expulsion system (NES).

The plurality of nodes (nodes A, B, C, and D) are connected to the CAN bus line, and node IDs (NIDs), which are different unique IDs, are set.

In the present invention, the NIDs, which are different unique IDs of each node, are set as illustrated in FIG. 1 before all nodes start communication. When a data frame is transmitted by filling 4 lower bits of a message ID area with an NID value, the NID serves as a fingerprint, so it is possible to know which node is transmitting the data frame.

The CAN bus according to the present invention is additionally connected to an intrusion detection system (IDS). An IDS is an intrusion detection system, and as illustrated in FIG. 2, a range of data that may be transmitted is set in advance according to a message ID (MID) and a data length code (DLC), and updated to the IDS and nodes in advance.

The IDS analyzes the content of a data frame loaded on the CAN bus line to determine whether the node is hacked.

The counter increases counts of a transmit error counter (TEC) and a receive error counter (REC) of a transmitting node and a receiving node whenever an error frame is generated, and decreases the counts of the TEC and REC of the transmitting node and the receiving node whenever a message is successfully transmitted.

The NES is mounted on each of the plurality of nodes and the IDS and allows a node of which the count of TEC or REC is greater than a set threshold value to enter a bus-off state to block the node.

All nodes of the CAN bus have the TEC and REC and are managed using the TEC and REC so that nodes with frequent errors do not interfere with the transmission and reception of other nodes.

When an error is found in any node, an error frame is generated. In this case, the count of the TEC of the transmitting node is increased by 8. In the case of the receiving node, the count of the REC of the node that first generates the error frame is increased by 8, and the count of the REC of other nodes is increased by 1.

Figure 3:
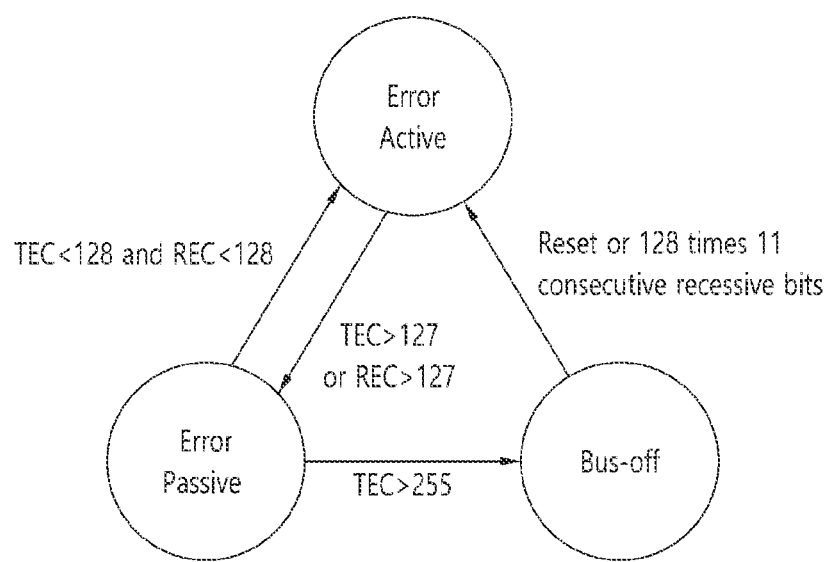
FIG. 3 is a diagram illustrating a state change of a node according to a transmit error counter (TEC) and a receive error counter (REC).

On the other hand, when the message is transmitted successfully, the TEC and REC of the transmitting node and the receiving node are each decreased by 1. FIG. 3 is a diagram illustrating a state change of anode according to the TEC and REC. In the error active state, normal transmission and reception are performed, but when the TEC or REC is 128 or greater, it enters an error passive state in which the transmission and reception are somewhat restricted.

In particular, when the count of the TEC is 256 or greater, it enters the bus-off state, and therefore the node is automatically separated from the bus and the transmission and reception are prohibited. The present invention proposes a technique of allowing a node transmitting a malicious data frame to enter a bus-off state using the TEC to prevent the node from overloading the bus or attacking other nodes.

Regarding CAN bus attack scenarios, three attack scenarios may be considered on the CAN bus. After a node is occupied, message patterns may be identified through sniffing, or a malicious data frame may be transmitted through a general attack to overload the bus or cause other nodes to malfunction.

In addition, a spoofing attack in which the malicious data frame is transmitted from a node pretending to be another node may be made. For example, the attack scenario is as follows.

In scenario 1, in sniffing, a node occupied through hacking is used to identify patterns by looking at messages being communicated on the bus. No harm is done to the CAN bus at this stage.

In scenario 2, in a general attack, a malicious data frame is transmitted using the occupied node after the message pattern is identified through the sniffing. Scenario 3 is a spoofing attack. A general attack and a spoofing attack are the same in that the malicious data frame is transmitted, but the spoofing attack differs from the general attack in that the occupied node pretends to be other nodes.

The NES, which is a function of expelling a hacked node by sending an error frame, is a function added in the present invention that is not present in a general CAN bus.

As an embodiment, the NES may be implemented by adding a circuit for sending an error frame to the CAN controller when a specific condition is satisfied. In the present invention, the NES is mounted on each node and the IDS.

Figure 4:
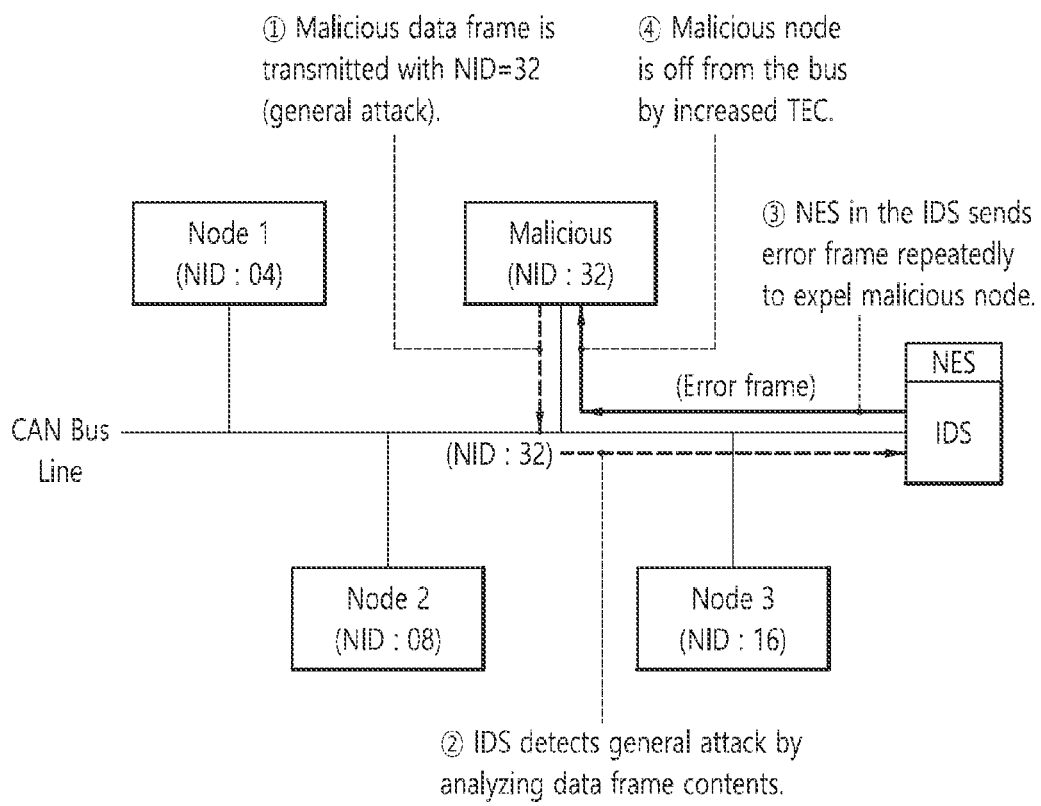
FIG. 4 is a diagram illustrating a counterattack process against a general attack according to the present invention.

In the present invention, the sniffing does not immediately adversely affect the bus, so no special measures are taken. However, in the general attack, when the occupied node transmits the malicious data frame as illustrated in FIG. 4, the IDS analyzes the content of the data frame and detects that the node has been hacked.

Thereafter, since the NES mounted on the IDS continues to send the error frame whenever the corresponding node performs the transmission, the corresponding node is blocked from transmitting and the TEC is increased, resulting in entering the bus-off state.

Specifically, it is the counterattack process against an attack in which the hacked node transmits the malicious data frame to overload the CAN bus or cause other nodes to malfunction. The IDS continuously monitors the CAN bus. ① When the malicious node transmits MID=0×102, DLC=4b0010, and Data=0×2000, ② the IDS sees that the table is different from the previously updated table and the node currently transmitting the data frame is determined as the hacked node.

③ The IDS that detects the hacked node transmits the error frame, and ④ the malicious node that receives the error frame while transmitting the data frame increases its TEC. An attack of stealing other normal nodes, which is another kind of attack, may not occur. This is because all nodes have a unique NID set thereon that may not be changed.

Figure 5:
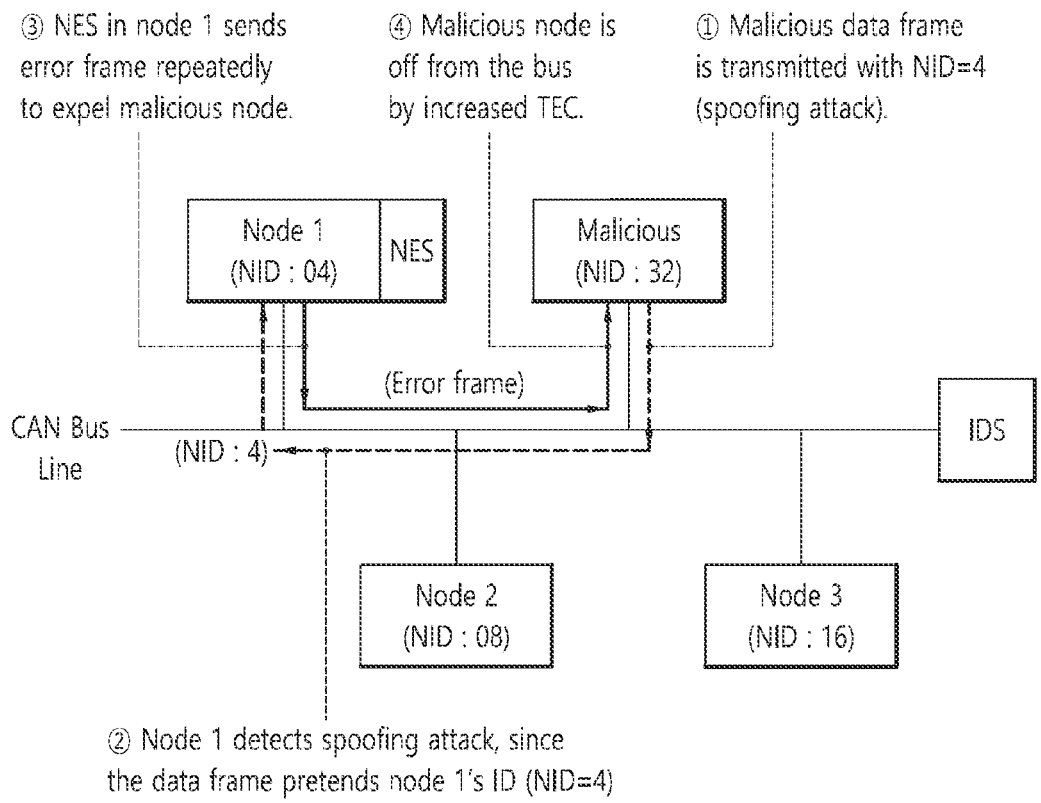
FIG. 5 is a diagram illustrating a counterattack process against a spoofing attack according to the present invention.

Meanwhile, in the spoofing attack, when the occupied node forges an NID and transmits the malicious data frame as illustrated in FIG. 5, since the forged node (i.e., the node originally using the forged NID) finds the same NID as its own, it is detected that the corresponding node has been hacked.

Thereafter, since the NES attached to the forged node continues to send the error frame whenever the corresponding node performs the transmission, the corresponding node is blocked from transmitting and the TEC is increased, resulting in entering the bus-off state.

In the present invention, when the malicious data frame is detected on the CAN bus, the IDS increases the error counter of the internal attack node and separates the internal attack node from the bus, thereby defending against the malicious attack.

Figure 6:
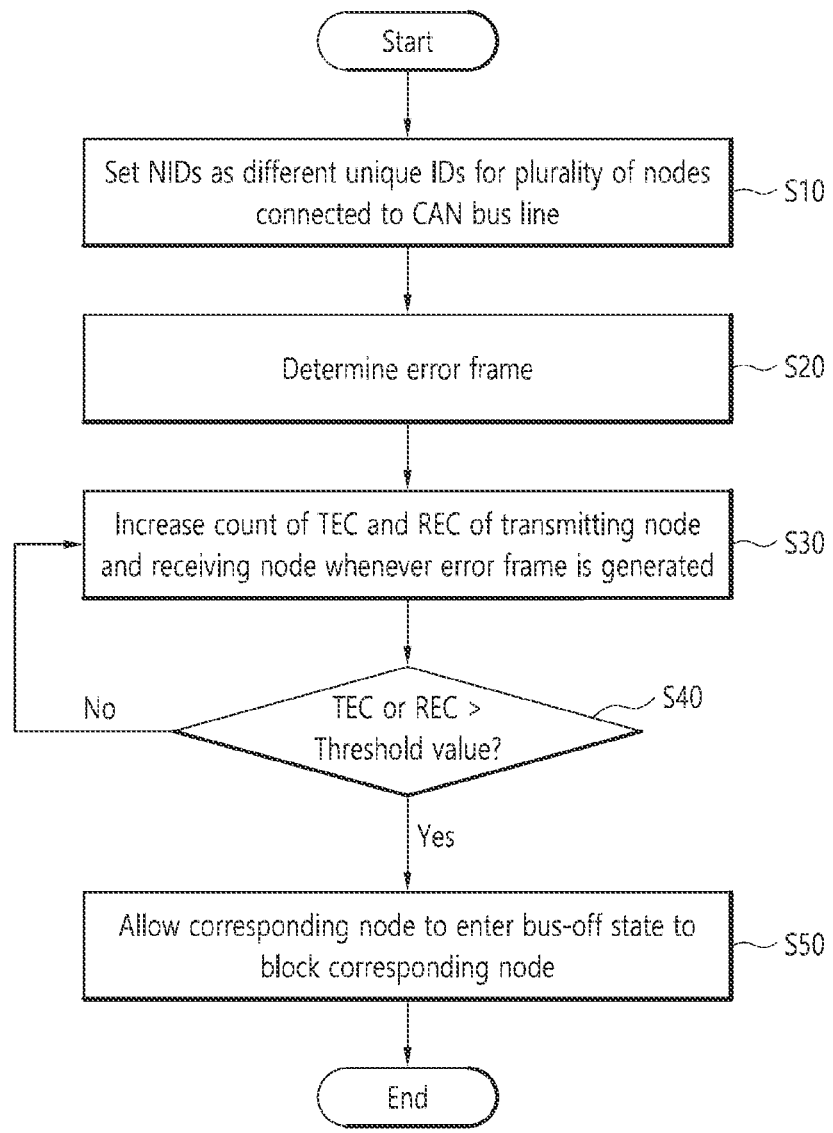
FIG. 6 is a flowchart of a counterattack method against a hacked node in a CAN bus physical layer according to an embodiment of the present invention.

FIG. 6 is a flowchart of a counterattack method against a hacked node in a CAN bus physical layer according to an embodiment of the present invention.

The counterattack method against a hacked node in a CAN bus physical layer according to the present embodiment may be performed in substantially the same configuration as the system 1 as illustrated in FIG. 1. Accordingly, components identical to those of the system 1 as illustrated in FIG. 1 are given the same reference numerals, and redundant descriptions thereof will be omitted.

In addition, the counterattack method against a hacked node in a CAN bus physical layer according to the present embodiment may be executed by counterattack software (a counterattack application) against a hacked node in a CAN bus physical layer.

In the present invention, when the malicious data frame is detected on the CAN bus, the IDS increases the error counter of the internal attack node and separates the internal attack node from the bus, thereby defending against the malicious attack.

Referring to FIG. 6, in the counterattack method against a hacked node in a CAN bus physical layer according to the present embodiment, NIDs, which are different unique IDs, are set for each of a plurality of nodes connected to the CAN bus line (operation S10). When transmitting the data frame, the 4 lower bits of the message ID area may be set as the NID value.

The data frame is determined as an error frame when at least one of a node using a forged NID, a node using a different NID, and a node using a non-existent NID is found (operation S20).

Since each node has its own NID set thereon, when the node using the forged NID is found, the node having the stolen NID set therein may detect hacking.

On the other hand, when the node using different NIDs or the node using the non-existent NID is found, the IDS may detect the hacking.

The counts of the TEC and REC of the transmitting node and the receiving node are increased whenever the error frame is generated (operation S30).

When the error frame is generated, the count of the TEC of the transmitting node may be increased by 8, and in the case of the receiving node, the count of the REC of the node that first generates the error frame may be increased by 8 and the count of the REC of other nodes may be increased by 1.

On the other hand, the counts of the TEC and REC of the transmitting node and the receiving node may be decreased whenever the message is successfully transmitted.

When the count of the TEC or REC is greater than the set threshold value (operation S40), the node is off from the bus and is blocked (operation S50). For example, when the count of the TEC or REC of the node becomes greater than 256, the node may be separated.

According to the counterattack method against a hacked node in a CAN bus physical layer, when the malicious data frame is detected on the CAN bus, the IDS increases the error counter of the internal attack node and separates the internal attack node from the bus to defend against the malicious attack.

It is possible to immediately counterattack against all network attacks that may occur on the CAN bus in a hardware method of setting the NID of the CAN controller and the IDS. Accordingly, it is possible to increase user safety and enhance security performance.

Simulation results for verifying the performance of the present invention are described below. In the present invention, the NES is mounted on the existing CAN controller, designed with Verilog HDL, and simulated with ModelSim. The NIDs of four CAN nodes were set to 4, 8, 16, and 32, and since the sniffing does not have an immediate adverse effect, the simulation was performed only on two types of attacks, the general and spoofing attacks.

Figure 7:
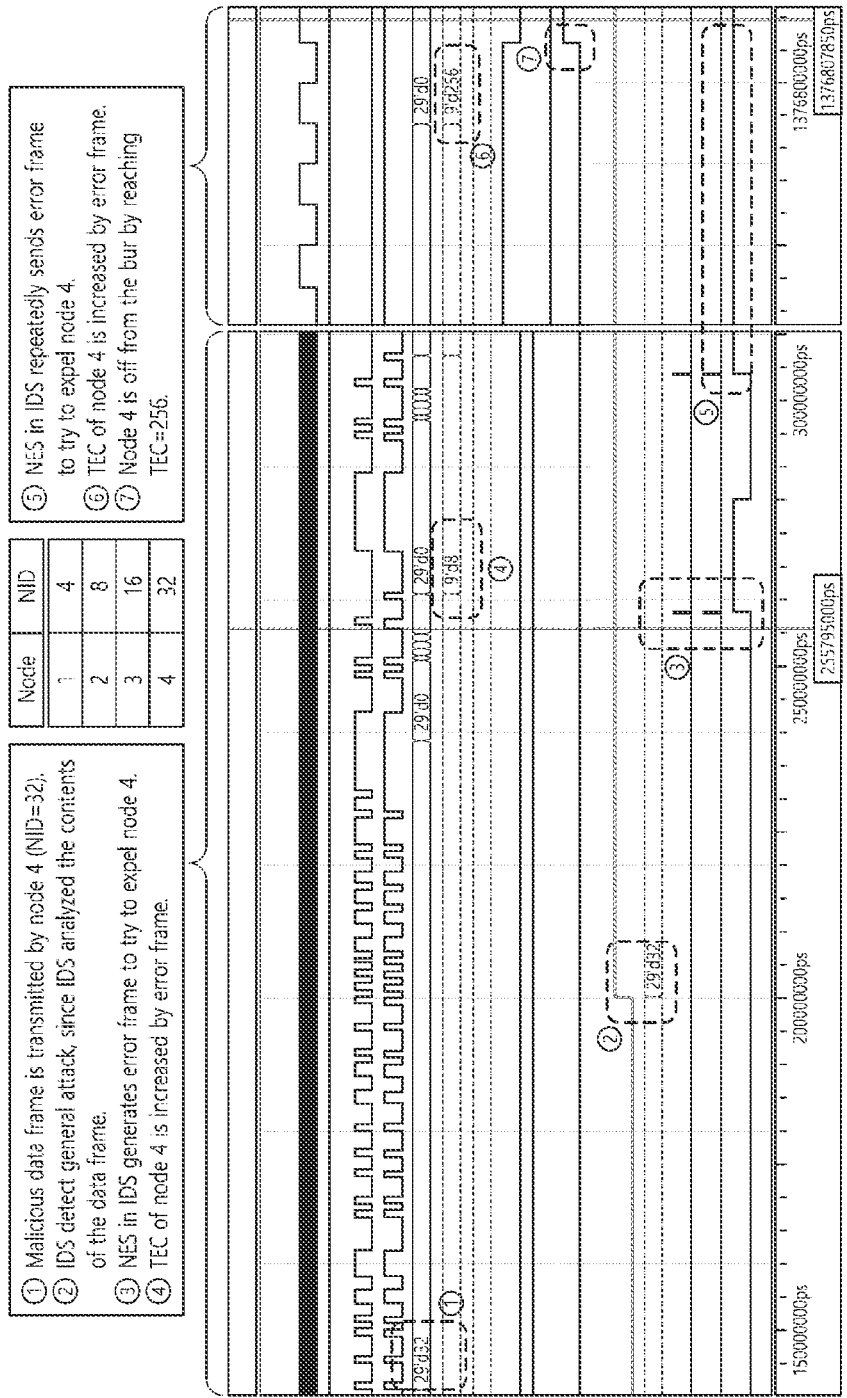
FIG. 7 is a diagram illustrating a simulation waveform of a counterattack operation against a general attack according to the present invention.

FIG. 7 illustrates a counterattack case against the general attack. At first, it operates normally, but after a certain period of time, the IDS detects an occupied node No. 4 (NID=32), and whenever the node No. 4 transmits a data frame, the IDS generates the error frame and increases the count of the TEC of the node No. 4. Thereafter, whenever the node No. 4 performs the transmission, the IDS continues to increase the TEC to enter the bus-off state.

Figure 8:
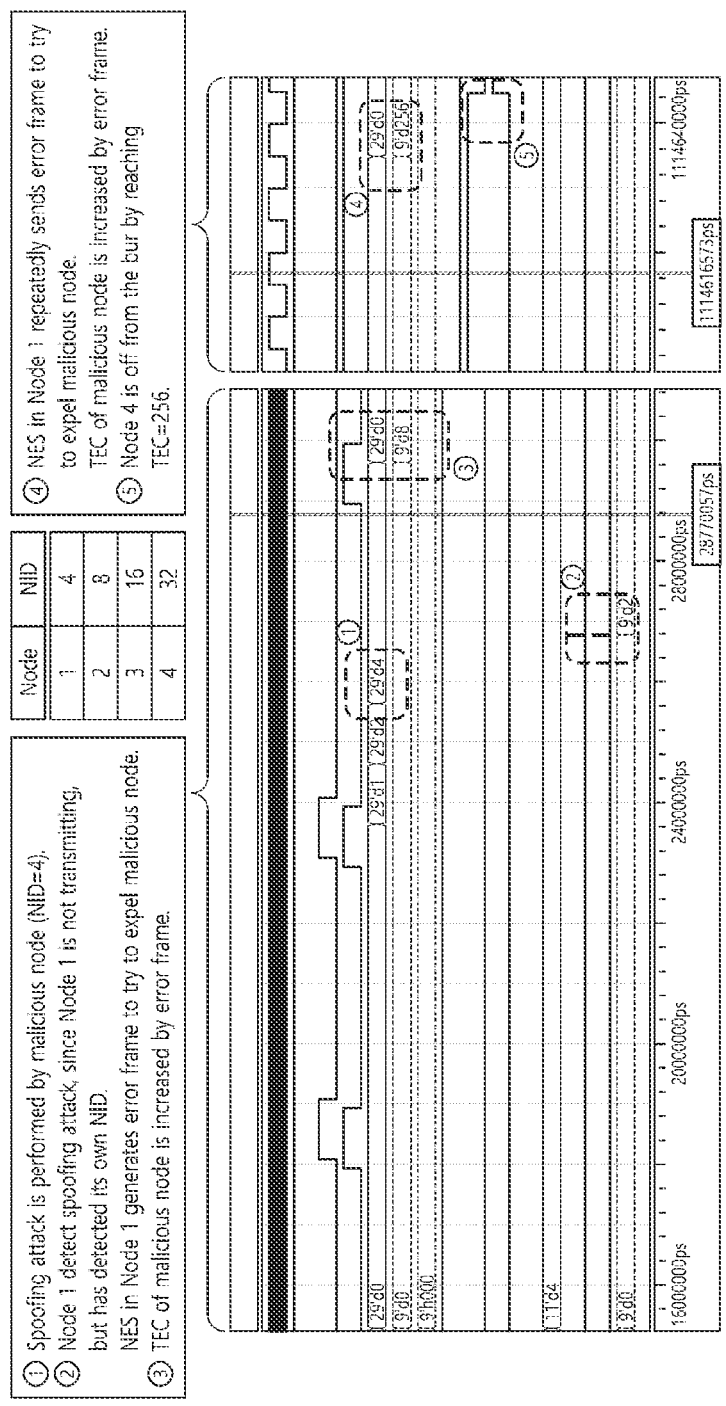
FIG. 8 is a diagram illustrating a simulation waveform of a counterattack operation against a spoofing attack according to the present invention.

FIG. 8 illustrates a counterattack case against the spooling attack, in which the occupied node No. 4 (NID=32) steals a node No. 1 (NID=4) and transmits a data frame. However, since the node No. 1 detects its own NID even though it is not transmitting, the node No. 1 recognizes the NID as an attack and generates an error frame to increase the count of the TEC of the node No. 4. Thereafter, whenever the node No. 4 steals the node No. 1 (NID=4), the node No. 1 continues to increase the TEC and enters the bus-off state.

On the CAN bus, if one of the nodes is hacked and transmits the malicious data frame, it is difficult to identify which node is the problem. In the present invention, a counterattack method against various attack scenarios that may occur in the CAN bus by modifying the existing CAN controller is proposed.

Such a counterattack method against a hacked node in a CAN bus physical layer may be implemented as an application or implemented in the form of program instructions that may be executed through various computer components and recorded on a computer-readable recording medium. The computer-readable recording medium may include a program command, a data file, a data structure, or the like, alone or in combination.

The program commands recorded in the computer-readable recording medium may be specially designed and constituted for the present invention or be known to those skilled in the field of computer software.

Examples of computer-readable recording medium may include a magnetic medium such as a hard disk, a floppy disk, or a magnetic tape, an optical recording medium such as a compact disc read-only memory (CD-ROM) or a digital versatile disk (DVD), a magneto-optical medium such as a floptical disk, and a hardware device specially configured to store and execute program commands, such as a read-only memory (ROM), a random access memory (RAM), a flash memory, or the like.

Examples of the program commands include a high-level language code capable of being executed by a computer using an interpreter, or the like, as well as a machine language code made by a compiler. The above-described hardware device may be constituted to be operated as one or more software modules to perform processing according to the present disclosure, and vice versa.

Figure 9:
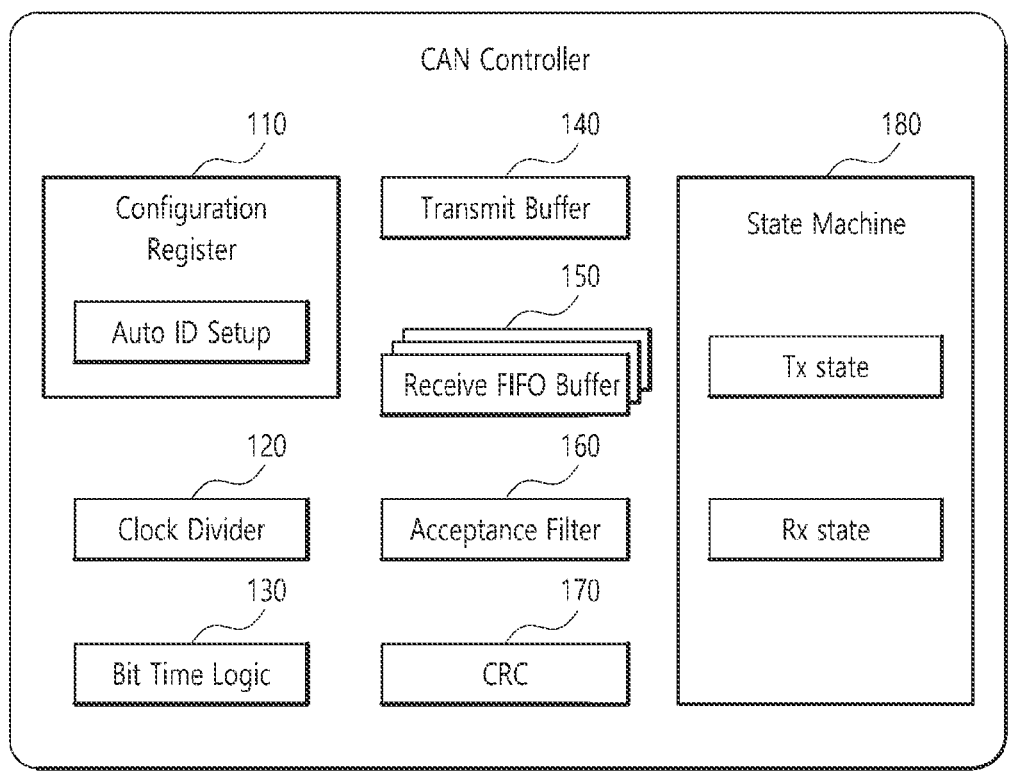
FIG. 9 is a block diagram of a physical layer security device with CAN bus node ID auto-setting in a CAN bus according to an embodiment of the present invention.

FIG. 9 is a block diagram of a physical layer security device with CAN bus node ID auto-setting in a CAN bus according to an embodiment of the present invention.

A physical layer security device 10 (hereinafter device) with CAN bus node ID auto-setting according to the present invention proposes physical layer security of automatically assigning a unique ID to an individual node when a CAN bus is booted up.

Referring to FIG. 9, the device 10 according to the present invention includes an auto ID setup unit 110, an NID storage unit (not illustrated), a state machine 180, and a transmit buffer 140. In an embodiment, the device 10 of the present invention may implement the proposed technique in a CAN controller using Verilog HDL. Also, the CAN controller may be implemented in a CAN system or in a node on a CAN bus.

As another embodiment, the device 10 of the present invention may further include at least one of a clock DivIDer 120, a bit time logic 130, a receive FIFO buffer 150, an acceptance filter 160, and a cyclic redundancy check (CRC) 170.

In the device 10 of the present invention, software (an application) for performing physical layer security through CAN bus node ID auto-setting may be installed and executed. The configuration of the auto ID setup unit 110, the NID storage unit (not illustrated), the state machine 180, and the transmit buffer 140 may be controlled by software for performing the physical layer security through the CAN bus node ID auto-setting executed on the device 10.

The device 10 may be a separate terminal or a part of a module of the terminal. In addition, the configuration of the auto ID setup unit 110, the NID storage unit (not illustrated), the state machine 180, and the transmit buffer 140 may be formed of an integrated module or formed of one or more modules. However, in contrast, each component may be formed as a separate module.

This device 10 may be mobile or may be stationary. The device 10 may be in the form of a server or an engine, and may be called other terms such as "apparatus," "terminal," "user equipment (UE)," "mobile station (MS)," "wireless device," or "handheld device."

The device 10 may execute or manufacture various software programs based on an operating system (OS), that is, a system. The operating system is a system program for enabling software to use the hardware of the device, and may include mobile computer operating systems such as Android OS, intelligent office system (iOS), Windows mobile OS, Bada OS. Symbian OS, and Blackberry OS, and operating systems such as Windows-based, Linux-based, Unix-based, MAC, AIX, and HP-UX systems.

Figure 10:
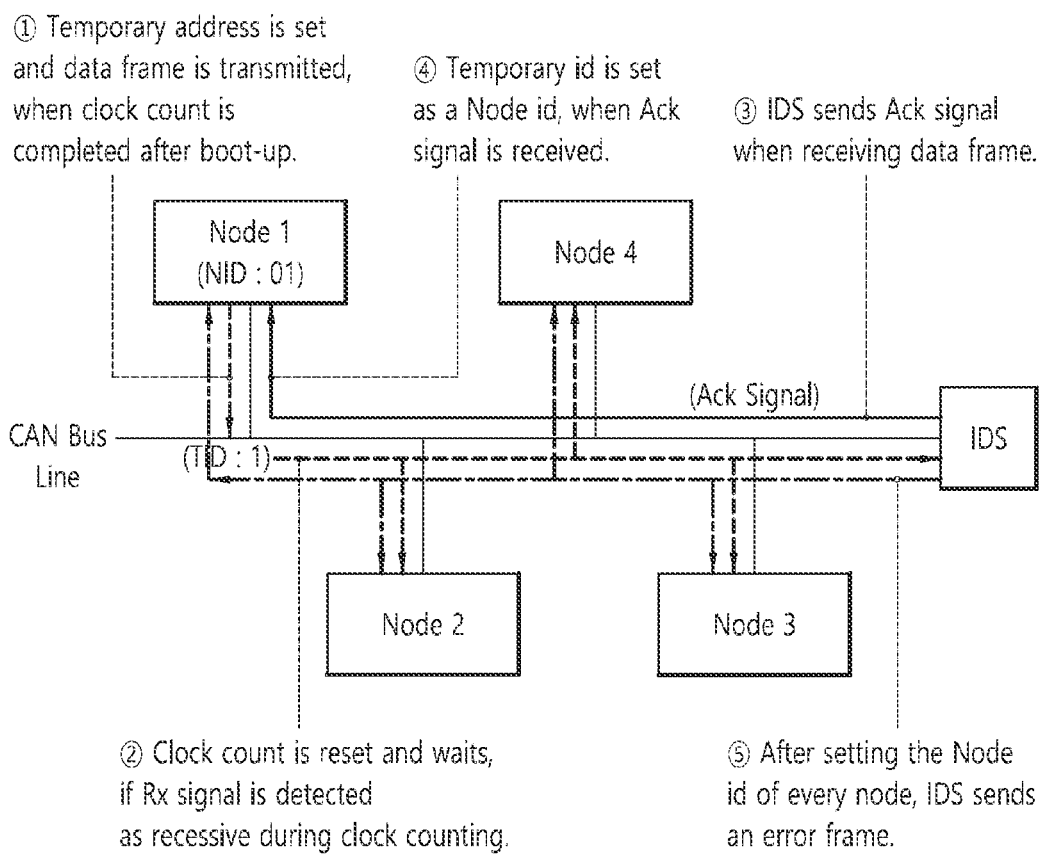
FIG. 10 is a diagram illustrating a process of automatically setting a node ID (NID) according to the present invention.

In the present invention, as illustrated in FIG. 10, it is possible to counterattack the CAN bus attack. In the present invention, hardware called the IDS and the node explosion system NES are used. The IDS analyzes the content of a data frame and determines whether the node that is currently transmitting is a hacked node. The NES is a block that performs a function of expelling a specific node designated by the IDS as a hacked node from the CAN bus, and it is a function not found in general CAN buses.

The IDS always monitors the CAN bus, and when a node transmits a malicious data frame, the IDS analyzes the data content to detect that the node has been hacked. Thereafter, whenever the hacked node performs the transmission, the NES generates an error frame to block the transmission regardless of the data content.

The hacked node continuously increases a transmission error count whenever it transmits data, passes the error passive state, and is off from the bus, so that the hacked node cannot perform the transmission anymore. In the present invention, unique IDs are assigned to all nodes inside the CAN bus as illustrated in FIG. 10.

When a unique ID is assigned to each CAN controller at the time of production, the number of bits of the unique ID is increased too much, and when a unique ID is assigned after all nodes are installed in a vehicle, the unique ID needs to be reassigned whenever parts are replaced. In order to solve this problem, the present invention proposes a method of automatically assigning a unique ID to each node when the CAN bus is booted up.

When the nodes connected to the CAN bus line are booted up, the auto ID setup unit 110 starts a clock count, sets a temporary ID (TID) when the clock counter reaches a threshold value, and transmits a data frame. Thereafter, a TID of a node receiving an Ack signal transmitted from the IDS that transmits the data frame with the set TID is set to different NIDs, which are unique IDs of each node.

The NID storage unit (not illustrated) stores NIDs of nodes that detect a recessive signal during a clock count operation or detect the recessive signal before generating a transmitter (Tx) signal after completing the clock count.

The state machine 180 starts the clock count again when the CAN bus enters an idle state, sets the TID to a value obtained by adding 1 to an NID finally appearing on a bus line when the clock count reaches the set value, and transmits the data frame.

When the NIDs of all nodes connected to the bus line are set, the transmit buffer 140 sends an error frame from the IDS to notify each node that the NID setting is completed to start communication.

In the present invention, when all nodes are booted up, the NID, which is the unique ID of the node, is automatically set. The method of setting an NID uses the fact that "all oscillators have errors." When the nodes connected to the CAN bus are booted up, if the clock count starts and reaches a sufficiently large value (for example, a sufficiently large value set to 16'hFFFF), as illustrated in FIG. 10, ① the TID is set and the data frame is transmitted. Since the data frame was transmitted, the recessive signal appears on the CAN bus.

② When nodes detect the recessive signal during the clock count operation, or the recessive signal before generating the Tx signal after the clock count is completed, other nodes initialize their clock counts, wait for communication to end, and store the NID appearing on the bus, since other nodes are using the CAN bus first.

③ The IDS that has transmitted the data frame with the set TID transmits the Ack signal ④ The node receiving the Ack signal from the IDS sets the TID to the NID. The clock count starts again when the CAN bus enters an idle state, the TID is set to a value obtained by adding 1 to the NID appearing on a bus line when the clock count reaches the set value, and the data frame is transmitted.

⑤ After repeating this process to set the NIDs of all the nodes connected to the bus, the IDS sends the error frame to inform each node that the NID setting is completed, and the nodes start communication.

For example, unique IDs of each node are set based on the clock count when the CAN bus is booted up. As illustrated in FIG. 2, all the nodes start the clock count as soon as they are booted up. Since there is a deviation in the clock oscillator circuit, when the clock count of a certain node first reaches 16'hFFFF, the ID of the corresponding node is set to 1 at that moment and the data frame is transmitted.

In this case, when the Ack signal is received from the IDS, the set address is set as the unique ID. On the other hand, when the Rx signal is detected as recessive while the clock count increases, the clock count is initialized and waits. In this case, each node stores the number of times of initialization of the clock count.

When the bus enters the idle state, the clock count starts again, and at the moment the clock count reaches 16'hFFFF, the value obtained by adding 1 to the number of times of initialization of the clock count is calculated, and then, when the Ack signal is received from the IDS, this calculated value is set to the unique ID.

In an embodiment, the node whose clock count reaches 16'hFFFF first becomes ID=1, the clock counts of other nodes are initialized, the node whose clock count reaches 16'hFFFF first among the remaining nodes becomes ID=2, and other nodes also have their clock count initialized. In this way, the addresses of all nodes connected to the bus are set.

In the present invention, in order to generate a difference in a clock count by using a minute error of an oscillator to set unique IDs of nodes, a sufficiently large number of clock counts need to be performed. However, when a large number of clock counts are performed, there is a disadvantage in that it takes a long time to set the unique IDs of the nodes connected to the CAN bus.

On the other hand, if a small number of clock counts are performed in order to shorten the time to set the unique ID, there may be a problem that the same unique ID is set because there is no difference in the clock count of the nodes. Therefore, the time to perform the clock count and the time to set the unique ID are in a trade-off relationship with each other.

The problem of setting the same unique ID may be found after the nodes start communicating. Broadly speaking, this is a case where nodes where the same unique ID is set transmit data at the same time, and a case in which one of the nodes having the same unique ID transmits data. A method of fixing this problem is as follows.

A. When Transmitting Data at the Same Time

When nodes where the same unique ID is set transmit data at the same time, there is a case of transmitting largely the same data and a case of transmitting different data.

When nodes where the same unique ID is set transmit the same data at the same time, no problem arises because both nodes achieve the purpose of data transmission.

Figure 11:
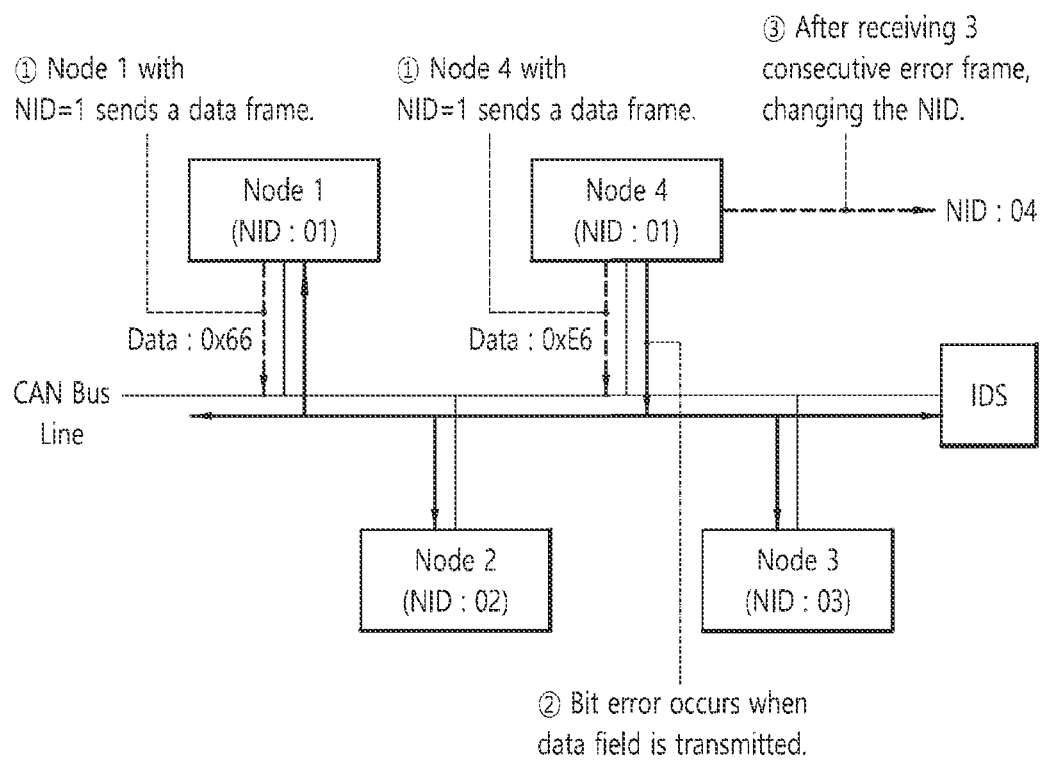
FIG. 11 is a diagram for describing a case in which nodes where the same NID is set simultaneously transmit data according to the present invention.

Referring to FIG. 11, ① when a node No. 1 and a node No. 4 where the same NID is set transmit different data at the same time, ② a bit error occurs in the process of transmitting a data field.

Figure 12:
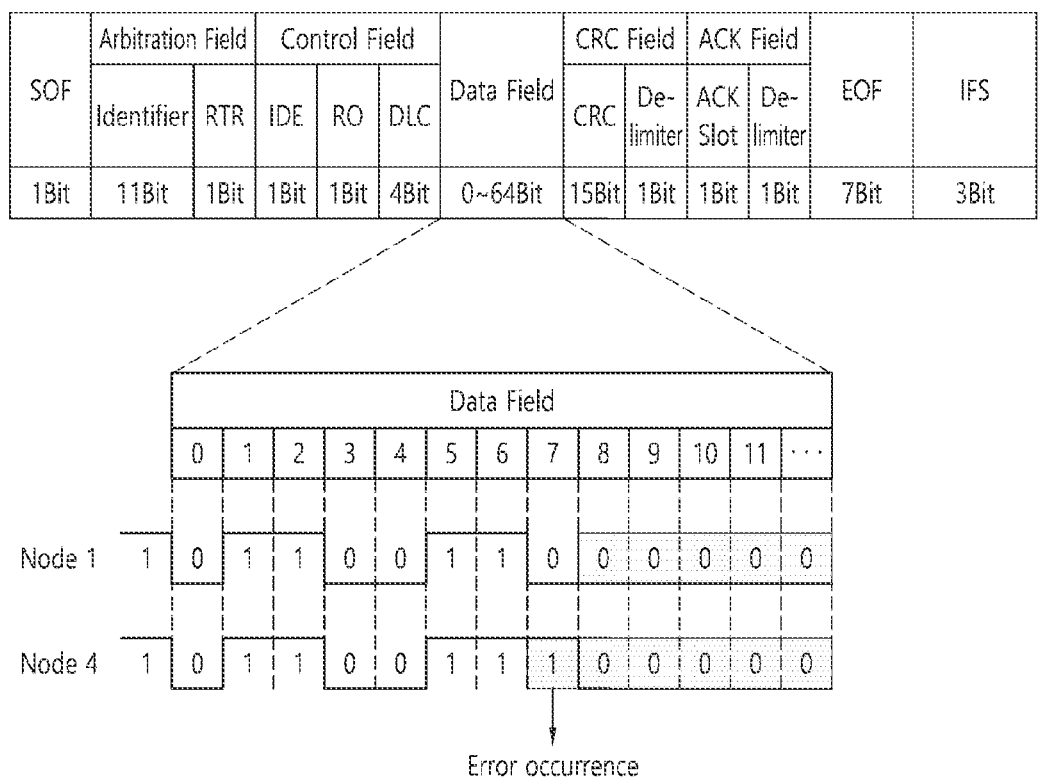
FIG. 12 is a diagram for describing a process in which a bit error occurs in a data field in the case of FIG. 11.

Looking at the process of generating a bit error in the data field, as illustrated in FIG. 12, a bit error occurs due to being pushed by the node No. 1 in the process of transmitting an 8$^{th}$ bit of a data field of the node No. 4. Since the node No. 1 and the node No. 4, which are transmitting data frames, receive error frames, the TEC is increased, and when they enter the bus idle state, the node No. 1 and the node No. 4 transmit the data frames again.

Then, in the process of transmitting the 8$^{th}$ bit of the data field of the node No. 4 again, the bit error occurs due to being pushed by the node No. 1. Using this phenomenon, when a node transmits a data frame, if the bit error occurs in the data field, the digit of a bit of the data field in which the error occurs is stored, ③ and when a bit error occurs in the same place consecutively 3 times, it is determined that the same NID is set without transmitting the error frame and the NID is changed.

The reason for determining that the same NID is set because the bit error occurs in the same place of the data field consecutively 3 times is as follows. This is because the occurrence probability of the bit error due to noise or a CAN bus problem is $3.1 \times 10^{-9}$, but the probability of the bit error occurring in the same place of the data field consecutively 3 times is as small as $29.8 \times 10^{-20}$. Also, in the case of 4 or more times, the count of the TEC of the normal node may be increased unnecessarily.

B. When One Node Transmits Data

Figure 13:
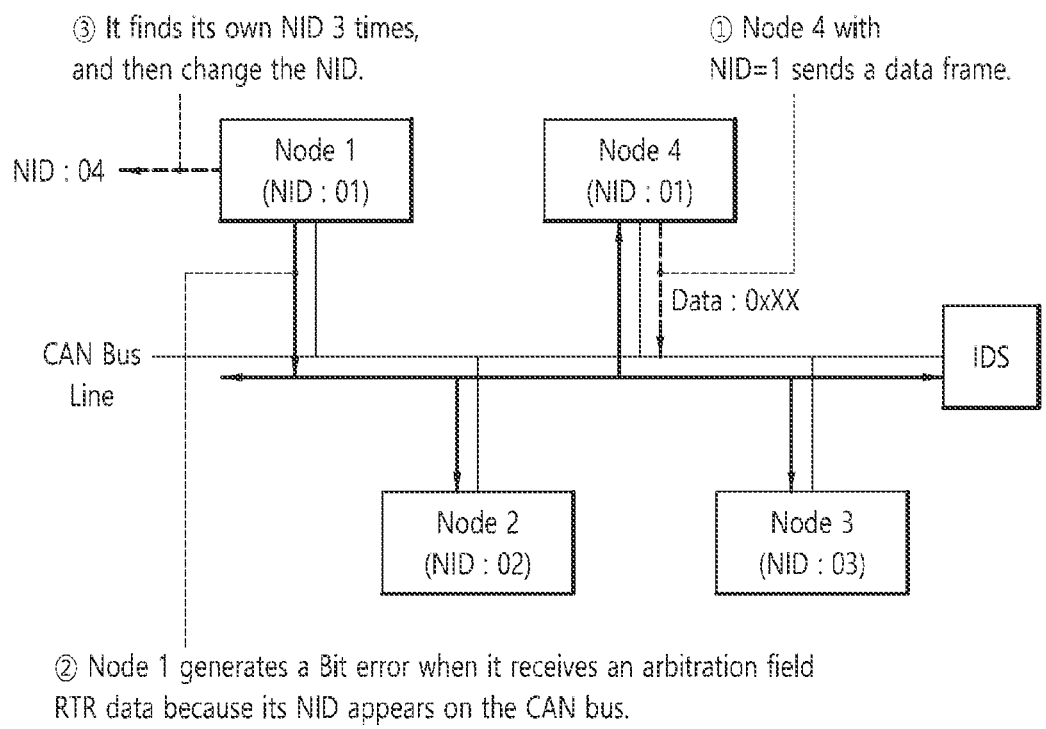
FIG. 13 is a diagram for describing a case in which one of the nodes where the same NID is set transmits data according to the present invention.
Figure 14:
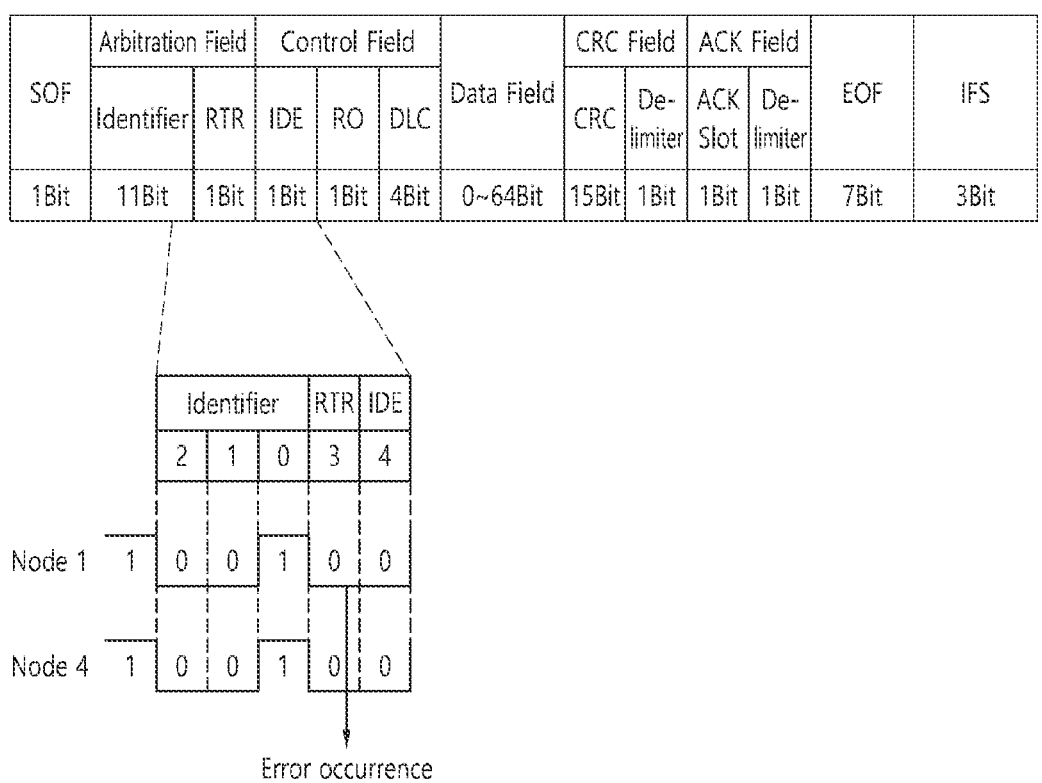
FIG. 14 is a diagram for describing a process of generating a bit error in an arbitration field in the case of FIG. 13.

As illustrated in FIG. 13, ① when one of the nodes where the same unique ID is set transmits data, the node that does not transmit data generates an error in the process of receiving ② arbitration field RTR data. Referring to the process in which an error occurs in the arbitration field, as illustrated in FIG. 14, the node No. 1 transmits the error frame and increases the REC because its own NID appears on the CAN bus even though it is not in a transmitting state.

Since the node No. 4, which is transmitting data, receives the error frame, when the TEC is increased and enters the bus idle state, the node No. 4 transmits the data frame again. Then, the node No. 1 again generates an error in the process of receiving the arbitration field RTR data.

Using this phenomenon, when a node transmits a data frame, a node that does not transmit data determines that the same NID is set and changes the NID if its own NID ③ appears consecutively 3 times on the CAN bus.

The reason why it is determined that the same NID is set because its own NID appears on the CAN bus consecutively 3 times is that the occurrence probability of the bit error due to the noise or CAN bus problem is $3.1 \times 10^{-9}$, but the probability of its own NID appearing in the arbitration field consecutively 3 time is as small as $29.8 \times 10^{-20}$. Also, in the case of 4 or more times, the count of the TEC of the normal node may be increased unnecessarily.

When the data frame is transmitted by filling 4 lower bits of a message ID area with the set NID, the NID serves as a fingerprint, so it is possible to know which node is transmitting the data frame.

The configuration of the CAN bus according to the present invention is additionally connected to an intrusion detection system (IDS). The IDS is an intrusion detection system, and as shown in a table in FIG. 15, a range of data that may be transmitted is set in advance according to a message ID (MID) and a data length code (DLC), and updated to the IDS and nodes in advance.

Figures 15, 16:
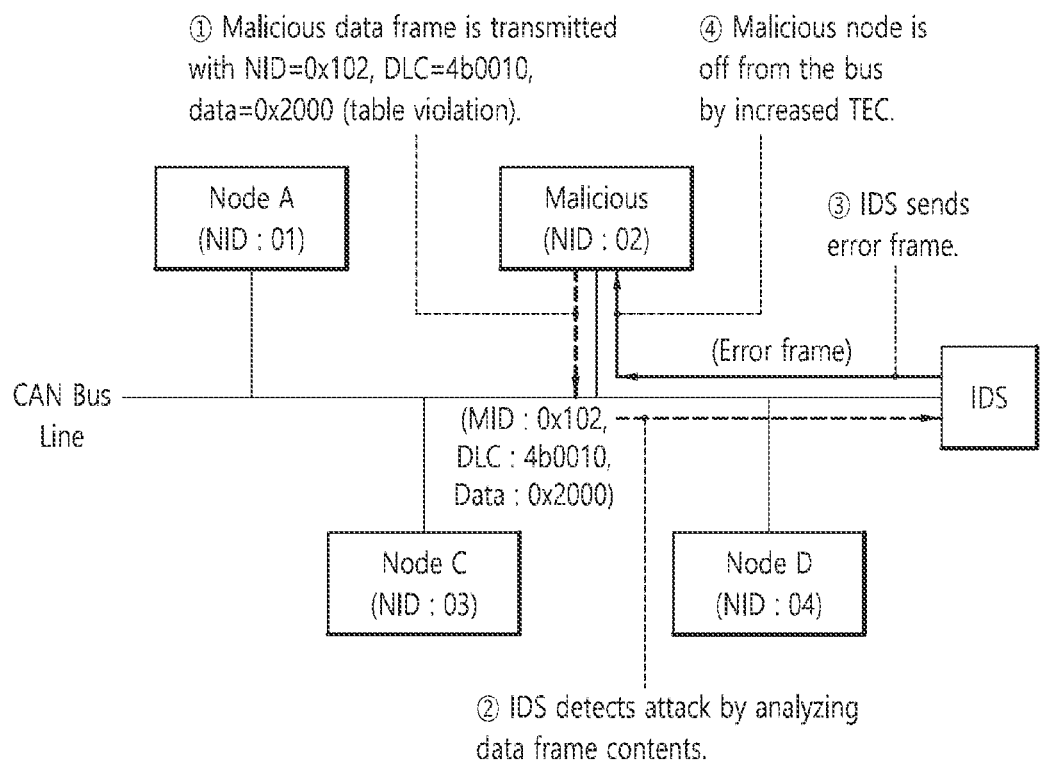
FIG. 15 is a table illustrating the transmittable data range according to the MID and the DLC of the node where the NID is set in FIG. 1.
FIG. 16 is a diagram for describing a process in which an IDS counterattacks against an attack in the present invention.

FIG. 16 illustrates the counterattack process against an attack in which the hacked node transmits the malicious data frame to overload the CAN bus or cause other nodes to malfunction. The IDS continuously monitors the CAN bus. ① When the malicious node transmits MID=0×102, DLC=4b0010, and Data=0×2000, ② the IDS sees that the table is different from the previously updated table and the node currently transmitting the data frame is determined as the hacked node.

③ The IDS that detects the hacked node transmits the error frame, and ④ the malicious node that receives the error frame while transmitting the data frame increases its TEC. An attack of stealing other normal nodes, which is another kind of attack, may not occur. This is because all nodes have a unique NID set thereon that may not be changed.

Since the nodes on the CAN bus do not have addresses, it is difficult to identify which node has been hacked if the nodes are hacked and transmit malicious data frames. In the present invention, by modifying the existing CAN controller, the unique ID of the node is automatically determined whenever the CAN bus is booted up, and thus it is possible to safely defend against attacks within the CAN bus.

Figure 17:
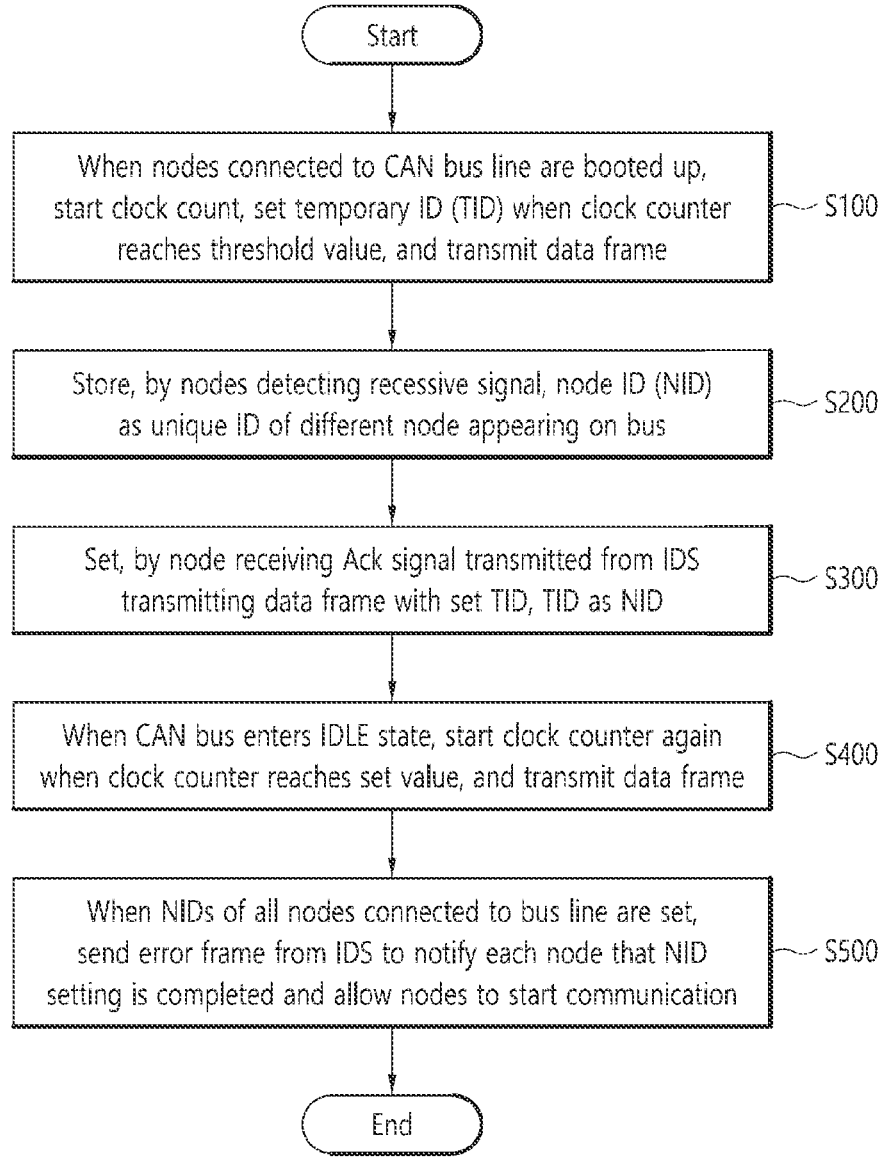
FIG. 17 is a flowchart of a physical layer security method with CAN bus node ID auto-setting according to an embodiment of the present invention.

FIG. 17 is a flowchart of a physical layer security method with CAN bus node ID auto-setting according to an embodiment of the present invention.

The physical layer security method with CAN bus node ID auto-setting according to the present embodiment may be performed in substantially the same configuration as the device 10 of FIG. 9. Accordingly, components identical to those of the device 10 of FIG. 10 are given the same reference numerals, and redundant descriptions thereof will be omitted.

In addition, the physical layer security method with CAN bus node ID auto-setting according to this embodiment may be executed by software (an application) for performing the physical layer security through the CAN bus node ID auto-setting.

The present invention proposes the physical layer security of automatically assigning a unique ID to an individual node when the CAN bus is booted up.

Referring to FIG. 17, when the nodes connected to the CAN bus line are booted up, the physical layer security method with CAN bus node ID auto-setting according to the present embodiment starts the clock count and sets the TID to transmit the data frame when the clock counter reaches the threshold value (e.g., 16'hFFFF) (operation S100).

Nodes that detect a recessive signal during the clock count operation or detect the recessive signal before generating a transmitter (Tx) signal after completing the clock count store node IDs (NIDs), which are unique IDs of different nodes each appearing on a bus (operation S200).

In this case, the node initializes the clock count and waits for the communication to end. When transmitting the data frame with the set NID, the set NID may be written in 4 lower bits of a message ID area and transmitted.

The TID of the node receiving the Ack signal transmitted from the IDS that transmits the data frame with the set TID is set as the NID (operation S300).

The clock count starts again when the CAN bus enters an idle state, the TID is set to a value obtained by adding 1 to the NID finally appearing on the bus line when the clock count reaches the set value, and the data frame is transmitted (operation S400).

When the operations (S100 to S400) are repeatedly performed to set the NIDs of all nodes connected to the bus line, the error frame is sent from the IDS to notify each node that the NID setting is completed and the nodes start communication (operation S500).

The bit error occurs in the data field when transmitting the data frame in a case in which nodes where the same NID is set are simultaneously transmitting different data. When the bit error occurs, the digit of a bit of the data field in which the error occurs is stored In addition, when a bit error occurs at the same digit consecutively a preset number of times (e.g., 3 times), it is determined that the same NID is set without transmitting the error frame, and the NID is changed.

When one of the nodes where the same NID is set transmits data, an error is generated while a node not transmitting data receives the arbitration field RTR data.

When a node transmits a data frame, a node that does not transmit data checks whether its own NID appears consecutively on the CAN bus a preset number of times (e.g., 3 times). When the node's own NID consecutively appears the preset number of times, it is determined that the same NID is set and the node's own NID is changed.

Simulation results for verifying the performance of the present invention are described below. In the present invention, it is implemented by adding the NES to the existing CAN controller, using the Verilog HDL, and simulated with ModelSim provided by IC Design Education Center (IDEC).

In the simulation, two situations were identified. One is a situation in which a unique node address is automatically assigned as the CAN bus is booted up, and the other is a situation in which the internal attack is made and the defense against the internal attack is made.

Figure 18:
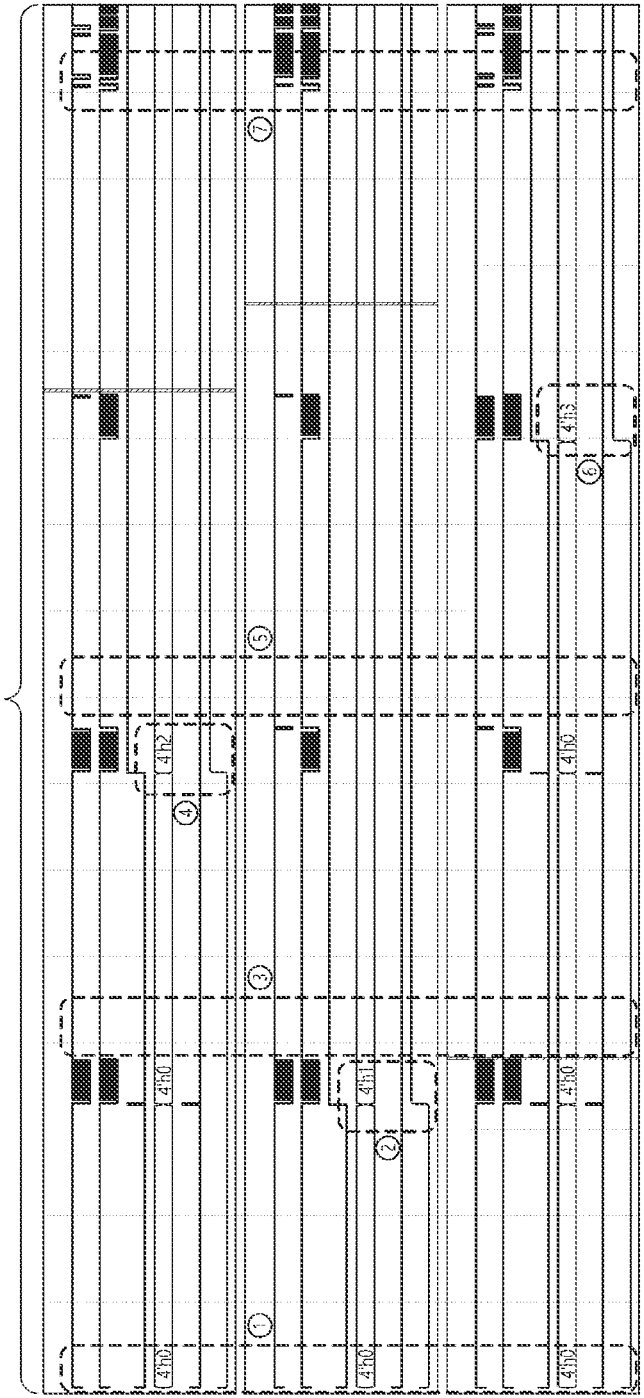
FIG. 18 is a diagram illustrating a simulation result of a process in which a unique ID of a node is automatically assigned while a CAN bus is booted up.

FIG. 18 illustrates a simulation result of automatically assigning a unique address of anode while booting up the CAN bus. At first, the booting starts and each node increases its clock count.

Referring to FIG. 18, an auto_con2 node whose clock count reaches 16'hFFFF first is assigned a unique ID of 1, and an auto_con1 node and an auto_con3 node initialize their clock counts as the Rx signal is detected as recessive during the clock count. In this case, the auto_con1 and auto_con3 nodes store the number of times of initialization of the clock count (1 at this point).

Now, when the bus enters the idle state, the clock count starts again. In this way, the unique ID setting is completed in the order of the auto_con1 node and auto_con3 node. When the bus becomes empty for a sufficient period of time, all the nodes determine that the ID assignment task is completed and start transmitting and receiving data frames while starting the actual operation.

Figure 19:
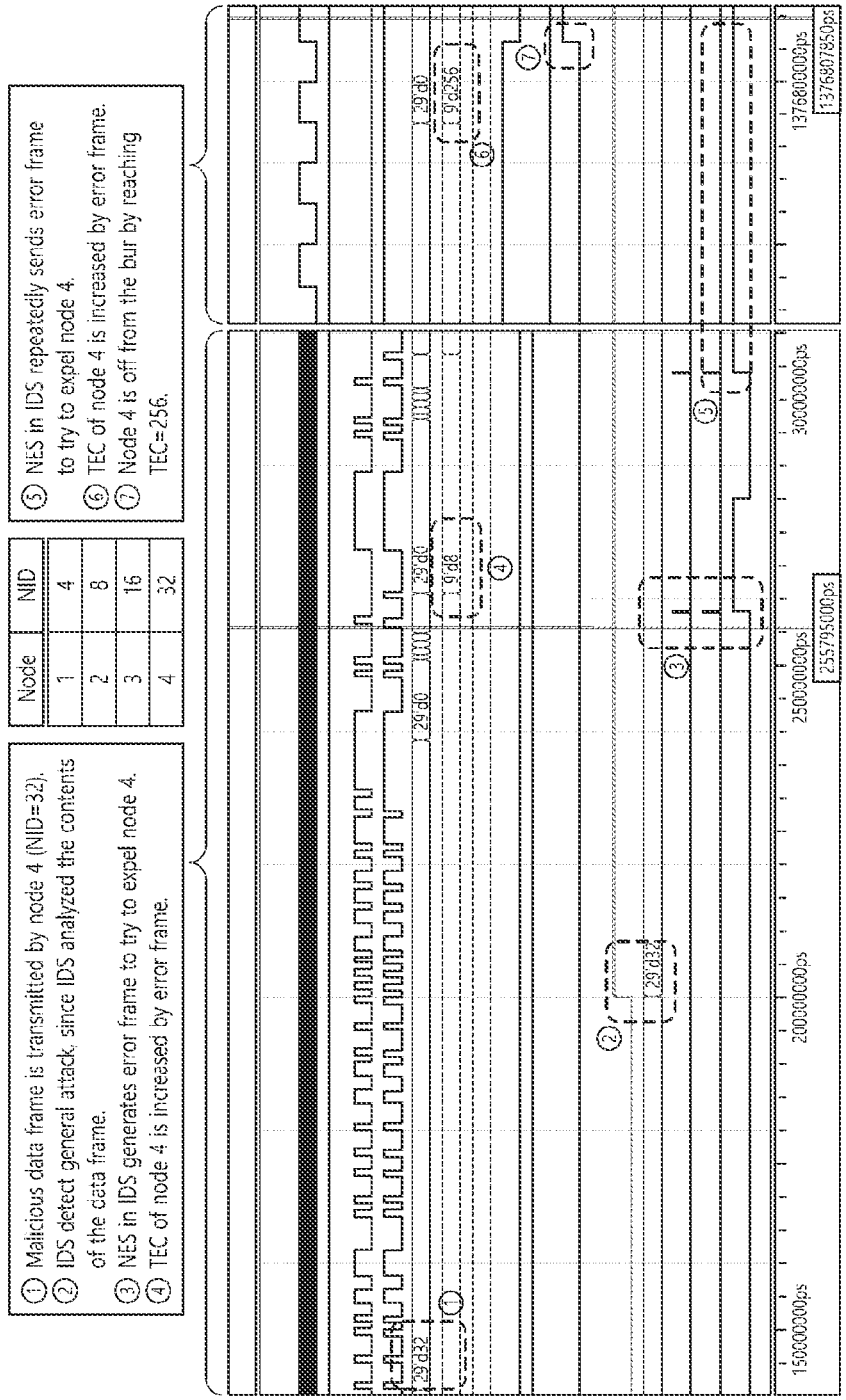
FIG. 19 is a diagram illustrating a simulation result of a counterattack operation against a CAN bus internal attack.

FIG. 19 is a simulation result in which the internal attack starts after the unique ID of each node is set and counter-attack the internal attack is made. In this simulation, it was assumed that the IDs of the four CAN nodes were set to 4, 8, 16, and 32. In FIG. 19, at first, the normal operation is performed, but after a certain time, the IDS looks at the data of the data frame and detects that a node with ID of 4 is hacked.

Thereafter, whenever the internal attacking node with the ID of 4 transmits the data frame, the error frame is generated to increase the count of the TEC of the corresponding node. This operation is performed whenever the internal attack node with the ID of 4 transmits the data frame, and the count of the TEC of the corresponding node continues to increase, eventually passing through the error passive state and becoming off from the bus.

According to the physical layer security method with CAN bus node ID auto-setting, each node of the present invention is distinguished by automatically assigning a unique ID to individual nodes whenever the CAN bus is booted up. According to the present invention, since the NID, which is the unique ID, is assigned whenever the CAN bus is booted up, it is possible to easily apply the unique ID and greatly reduce the number of bits of the unique ID regardless of replacement of parts.

In addition, it is possible to counterattack all the network attacks that may occur on the CAN bus by setting the IDS and the NID of the CAN controller. Accordingly, it is possible to increase user safety and enhance security performance.

Therefore, the physical layer security method with CAN bus node ID auto-setting may be implemented as an application or implemented in the form of program commands that may be executed through various computer components and recorded on a computer-readable recording medium. The computer-readable recording medium may include a program command, a data file, a data structure, or the like, alone or in combination.

The program commands recorded in the computer-readable recording medium may be specially designed and constituted for the present invention or be known to those skilled in the field of computer software.

Examples of computer-readable recording medium may include a magnetic medium such as a hard disk, a floppy disk, or a magnetic tape, an optical recording medium such as a compact disc read-only memory (CD-ROM) or a digital versatile disk (DVD), a magneto-optical medium such as a floptical disk, and a hardware device specially configured to store and execute program commands, such as a read-only memory (ROM), a random access memory (RAM), a flash memory, or the like.

Examples of the program commands include a high-level language code capable of being executed by a computer using an interpreter, or the like, as well as a machine language code made by a compiler. The above-described hardware device may be constituted to be operated as one or more software modules to perform processing according to the present disclosure, and vice versa.

Although the embodiments of the present invention have been disclosed hereinabove, it may be understood by those skilled in the art that the present invention may be variously modified and altered without departing from the scope and spirit of the present invention described in the following claims.

INDUSTRIAL APPLICABILITY

In most automobiles today, main electronic control units (ECUs) inside a vehicle are connected in a bus topology method using a controller area network (CAN) communication protocol. The present invention identifies malicious nodes that occur on the CAN bus and counterattacks the identified malicious nodes quickly to prepare for accidents, and therefore can be usefully applied to vehicle ECUs and other devices using CAN communication.

DETAILED DESCRIPTION OF MAIN ELEMENTS

1: Counterattack system against hacked node in CAN bus physical layer
10: Physical layer security device with CAN bus node ID auto-setting

The invention claimed is:

1. A counterattack method against a hacked node in a controller area network (CAN) bus physical layer, comprising:
setting node IDs (NIDs), which are different unique IDs, for each of a plurality of nodes connected to a CAN bus line;
determining that an error frame is generated when at least one of a node using a forged NID, a node using a different NID, and a node using a non-existent NID is found;
increasing counts of a transmit error counter (TEC) and a receive error counter (REC) of a transmitting node and a receiving node whenever the error frame is generated; and
allowing a node of which the count of the TEC or REC is greater than a set threshold value to enter a bus-off state to block the node.

2. The counterattack method of claim 1, wherein determining that the error frame is generated comprises,
detecting hacking by a node where a stolen NID is set when a node using a forged NID is found.

3. The counterattack method of claim 1, wherein determining that the error frame is generated comprises,
detecting hacking by an intrusion detection system (IDS) when a node using a different NID or a node using a non-existent NID is found.

4. The counterattack method of claim 1, wherein the setting node IDs (NIDs), which are different unique IDs, for each of the plurality of nodes connected to the CAN bus line comprises,
setting 4 lower bits of a message ID area as an NID value when transmitting a data frame.

5. The counterattack method of claim 1, wherein increasing the counts of the TEC and REC of the transmitting node and the receiving node whenever the error frame is generated comprises,
increasing the count of the TEC of the transmitting node by 8, and in a case of the receiving node, increasing the count of the REC of a node that first generates an error frame by 8, and increasing the count of the REC of other nodes by 1 when the error frame is generated.

6. The counterattack method of claim 1 further comprises,
decreasing the counts of the TEC and REC of the transmitting node and the receiving node whenever a message is successfully transmitted.

7. The counterattack method of claim 1, wherein allowing the node of which the count of the TEC or REC is greater than the set threshold value to enter the bus-off state to block the node comprises,
separating the node when the count of the TEC or REC of the node is greater than 256.

8. A computer-readable storage medium on which a computer program for executing the counterattack method against a hacked node in a CAN bus physical layer of claim 1 is recorded.

9. A counterattack system against a hacked node in a controller area network (CAN) bus physical layer, comprising:
a plurality of nodes connected to a CAN bus line and having node IDs (NIDs), which are different unique IDs, set thereon;
an intrusion detection system (IDS) for determining whether a node has been hacked by analyzing contents of a data frame loaded into the CAN bus line;
a counter for increasing counts of a transmit error counter (TEC) and a receive error counter (REC) of a transmitting node and a receiving node whenever an error frame is generated, and decreasing the counts of the TEC and REC of the transmitting node and the receiving node whenever a message is successfully transmitted; and
a node explosion system (NES) mounted on each of the plurality of nodes and the IDS and for allowing a node of which the count of TEC or REC is greater than a set threshold value to enter a bus-off state to block the node.

10. The system of claim 9, wherein, when a node using a forged NID is found, the NES of a node where a stolen NID is set detects hacking.

11. The system of claim 9, wherein, when a node using a different NID or a node using a non-existent NID is found, the NES of the IDS detects hacking.

12. The system of claim 9, wherein the NID of each node is set in 4 lower bits of a message ID area when transmitting a data frame.

13. A physical layer security method with controller area network (CAN) bus node ID auto-setting, comprising:
   starting a clock count when nodes connected to the CAN bus line are booted up, and setting a temporary ID (TID) when the clock counter reaches a threshold value and transmitting a data frame;
   storing, by nodes that detect a recessive signal during the clock count operation or detect the recessive signal before generating a transmitter (Tx) signal after completing the clock count, node IDs (NIDs), which are different unique IDs of each node, appearing on a bus;
   setting a TID of a node receiving an Ack signal transmitted from an intrusion detection system (IDS) that transmits the data frame with the set TID as the NID; and
   starting the clock count again when the CAN bus enters an idle state, setting the TID to a value obtained by adding 1 to an NID appearing on a bus line when the clock count reaches the set value and transmitting the data frame.

14. The physical layer security method of claim 13 further comprises,
   transmitting, when the operations are repeatedly performed to set the NIDs of all nodes connected to the bus line, an error frame from the IDS to notify each node that the NID setting is completed and allow the nodes to start communication.

15. The physical layer security method of claim 14, wherein, when transmitting the data frame with the set NID, the set NID is written in 4 lower bits of a message ID area and transmitted.

16. The physical layer security method of claim 15 further comprises,
   detecting occurrence of a bit error in a data field when transmitting the data frame in a case in which nodes where the same NID is set simultaneously transmit different data;
   storing, in response to detecting the occurrence of the bit error, the digit of a bit of the data field, in which the bit error occurs; and
   determining, when the bit error consecutively occurs at the same digit a preset number of times, that the same NID is set without transmitting an error frame and changing the NID.

17. The physical layer security method of claim 15 further comprises,
   detecting, when one of the nodes where the same NID is set transmits data, occurrence of an error while a node not transmitting data receives arbitration field RTR data;
   checking, when a node transmits the data frame, by a node that does not transmit data, whether the node's own NID consecutively appears on the CAN bus a preset number of times; and
   determining, when the node's own NID consecutively appears the preset number of times, that the same NID is set and changing the node's own NID.

18. The physical layer security method of claim 13, wherein storing the node IDs (NIDs), which are unique different IDs of each node, appearing on the bus further comprises,
   initializing the clock count and waiting for communication to end.

19. The physical layer security method of claim 13, wherein setting the TID and transmitting the data frame comprise,
   setting the threshold value of the clock count to 16'hFFFF.

20. A computer-readable storage medium on which the computer program for executing the physical layer security method with CAN bus node ID auto-setting of claim 13 is recorded.

21. A physical layer security apparatus with a controller area network (CAN) bus node ID auto-setting, comprising:
   an auto ID setup unit configured to, when nodes connected to a CAN bus line are booted up, start a clock count, set a temporary ID (TID) when the clock counter reaches a threshold value, and transmit a data frame, and set the TID of a node receiving an Ack signal transmitted from an intrusion detection system (IDS) transmitting a data frame with the set TID to node IDs (NIDs), which are different unique IDs of each node;
   an NID storage unit configured to store NIDs of nodes that detect a recessive signal during a clock count operation or detect the recessive signal before generating a transmitter (Tx) signal after completing the clock count;
   a state machine configured to start the clock count again when the CAN bus enters an idle state, set the TID to a value obtained by adding 1 to an NID appearing on a bus line when the clock count reaches a set value, and transmit a data frame; and
   a transmit buffer configured to, when the NIDs of all nodes connected to the bus line are set, transmit an error frame from the IDS to notify each node that the NID setting is completed to start communication.

22. The physical layer security apparatus of claim 21, wherein the physical layer security apparatus is implemented on a CAN controller,
   wherein, in a case where nodes having the same NID set therein simultaneously transmit different data, when a bit error occurs in a data field when transmitting a data frame, the physical layer security apparatus stores the digit of a bit of the data field in which the error occurs, and when the bit error consecutively occurs at the same digit a preset number of times, does not transmit an error frame, determines that the same NID is set, and changes the NID, and
   wherein, when one of the nodes where the same NID is set transmits data and when an error occurs while a node that does not transmit data receives arbitration field RTR data, the node that does not transmit data checks whether the node's own NID consecutively appears on the CAN bus a preset number of times when a node transmits the data frame, and determines, when the node's own NID consecutively appears the preset number of times, that the same NID is set and changes the node's own NID.

* * * * *